C. H. PERKINS.
Band-Pulleys.
No. 135,151.    Patented Jan. 21, 1873.
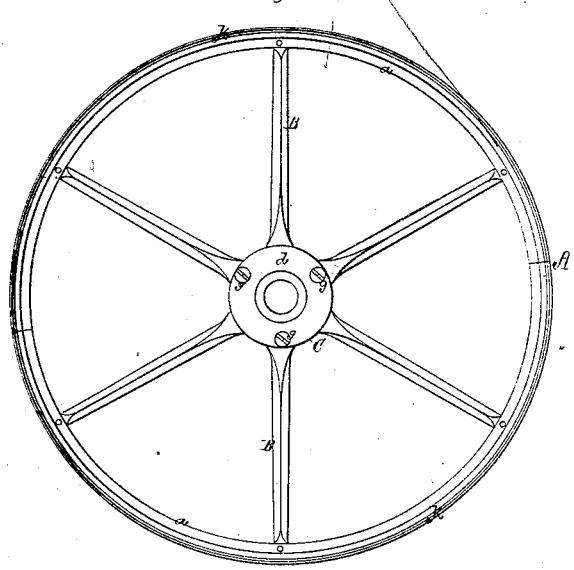
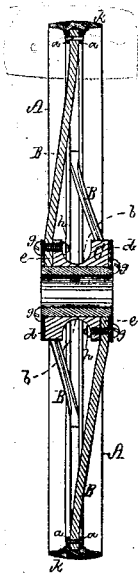
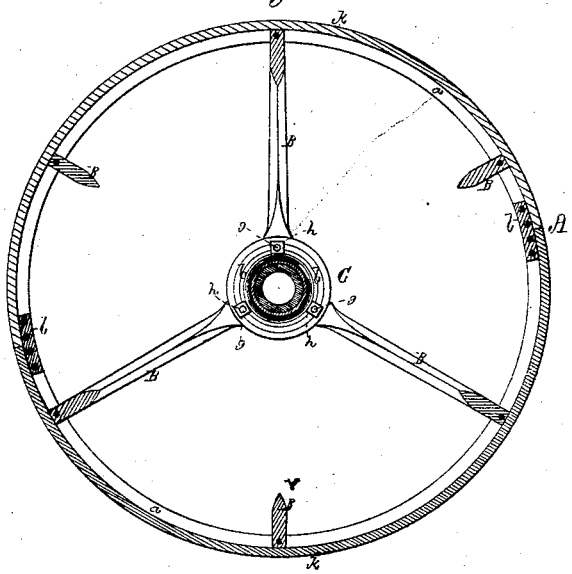
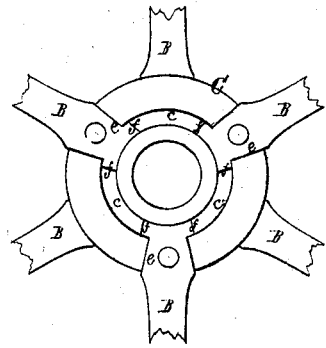
Witnesses.
S. N. Piper
L. N. Möller
Charles Henry Perkins
by his attorney.
R. H. Eddy

UNITED STATES PATENT OFFICE.

CHARLES HENRY PERKINS, OF PROVIDENCE, RHODE ISLAND.

IMPROVEMENT IN BAND-PULLEYS.

Specification forming part of Letters Patent No. 135,151, dated January 21, 1873.

*To all whom it may concern:*

Be it known that I, CHARLES HENRY PERKINS, of the city and county of Providence and State of Rhode Island, have invented a new and useful Improvement in Band-Wheels or Pulleys; and do hereby declare the same to be fully described in the following specification and represented in the accompanying drawing, of which—

Figure 1 is a side elevation, and Fig. 2 a transverse section, of one of my improved band-wheels or pulleys. Fig. 3 is a longitudinal section of the tire. Fig. 4 is an end view of the hub, showing the spoke-heads and the chamber for their reception.

This band-wheel, with the exception of the hub, is intended to be of wrought-iron, in order that it may endure a very high velocity of rotary motion. The rim A of the wheel has two or any other suitable number of flanges, $a\ a$, projecting inward from it, such rim, before being bent circularly, being a straight bar, rolled with one or more flanges, as described, such flanges being not only to strengthen the rim, but to serve as a means of fixing the spokes B to it. In this wheel each spoke B is shown as introduced at its outer end between the two flanges $a\ a$, and confined to them by a rivet or rivets going though it and them. The hub C is not only grooved around its circumference, as shown at $b\ b$, but is chambered at each end, or has in such end a circular or annular chamber, $c$, provided with an annular cap-plate, $d$. This chamber has openings through its periphery to receive the spoke-heads $e$, such being formed with shoulders $f\ f$, arranged as shown, such shoulders serving, when the cap is in place and secured by screw-bolts $g$, to keep the spokes from being drawn out of the hub radially thereof, and also to relieve the screw-bolts from the strain or draft tending to pull the spokes out of the hub and to break the bolts. Each screw-bolt goes through the cap and one of the spoke-heads, and into the groove $b$, and there receives a nut, $h$, the said groove serving as a protection to the nuts. The rim may be in one piece, bent in the form of a hoop; or it may be in two or more sections, $k\ k$. At the junction of the ends of the rim, or at each joint, there is a metallic lap-piece, $l$, inserted in the space between the flanges and extending in opposite directions from the joint, the said lap-piece and the adjacent parts of the rim being secured together by rivets going through them.

I claim—

1. In the band-wheel or pulley, the combination of the flanged rim A and the joint lap or laps $l$ with the chambered hub C and the spokes B formed and applied to the hub and the rim, as set forth, all being combined and arranged substantially as specified.

2. In a wrought-iron band-wheel or pulley, a flanged rim made in one piece, or more, with a lap-piece arranged at and secured to the rim at each joint, as set forth, and with the spokes bolted or fastened to the flange or flanges of the rim, all being essentially as specified.

CHARLES HENRY PERKINS.

Witnesses:
R. H. EDDY,
J. R. SNOW.